United States Patent [19]
Bekedam

[11] Patent Number: 5,310,417
[45] Date of Patent: May 10, 1994

[54] ATMOSPHERIC DEAERATOR

[76] Inventor: Martin Bekedam, 19059 N. 88th Ave., Westbrook Village, Peoria, Ariz. 85382

[21] Appl. No.: 31,718

[22] Filed: Mar. 15, 1993

[51] Int. Cl.⁵ .............................................. B01D 19/00
[52] U.S. Cl. ..................................... 96/157; 95/244; 96/203; 96/202
[58] Field of Search .................. 55/39, 40, 53, 54, 196, 55/198, 213, 217

[56] References Cited

U.S. PATENT DOCUMENTS

| | | | |
|---|---|---|---|
| 2,677,433 | 5/1954 | Kretzschmar | 55/39 |
| 2,872,999 | 2/1959 | Spinning | 55/198 |
| 3,487,611 | 1/1970 | Bekedom | 55/39 X |
| 3,834,133 | 9/1974 | Bow | 55/39 X |
| 4,698,076 | 10/1987 | Bekedam | 55/196 X |
| 4,874,406 | 10/1989 | Bekedam | 55/198 |

Primary Examiner—Charles Hart
Attorney, Agent, or Firm—Bielen, Peterson & Lampe

[57] ABSTRACT

An atmospheric deaerator unit having a vessel divided into an atmospheric section and a low pressure section, the low pressure section containing steam supply line for deaerating a water spray circulated from the atmospheric section through a water circulating line using a series of spray heads for spraying water into the low pressure section, the circulating line communicating between the low pressure section and the atmospheric section, the atmospheric section having a vent open to atmosphere with a vent condenser to purge vented non-condensible gases from the atmospheric section, and, the low pressure section being pressure protected by a water column conduit communicating between the vessel sections to return overflow water and blow-through excess pressurized steam and vapor from the pressurized section to the atmospheric section, the unit being controlled by a steam control valve using pressure of the pressurized section or water temperature in the atmospheric section.

10 Claims, 1 Drawing Sheet

ATMOSPHERIC DEAERATOR

BACKGROUND OF THE INVENTION

This invention relates to an atmospheric deaerator unit for use in a boiler feedwater system for eliminating non-condensible gases from the boiler feedwater. Non-condensible gases are principally carried into the feedwater system by the addition of makeup water to compensate for losses during the steam cycle. Additionally, gases can be generated in the steam circuit, such as carbon dioxide, which is generated from carbonate salts reacting with metallic components in the steam circuit.

The atmospheric deaerator of this invention is of the type described in my prior U.S. Pat. No. 4,698,076 issued Oct. 6, 1987, entitled ATMOSPHERIC DEAERATOR UNIT, in my U.S. Pat. No. 3,487,611 issued Jan. 6, 1970, entitled SPRAY-FLOW DEAERATOR, and in particular, in my U.S. Pat. No. 4,874,406 issued Oct. 17, 1989, entitled JET SPRAY ATMOSPHERIC DEAERATOR.

Generally, deaerators are rated as either 0.03 cc/liter or 0.005 cc/liter deaerators. The latter being the most effective in removing dissolved gases. In general, to achieve a reduction of dissolved air and gases to 0.005 cc/liter, the deaerator must operate in a pressurized circuit. While the referenced patents entitled ATMOSPHERIC DEAERATOR UNIT, and JET SPRAY ATMOSPHERIC DEAERATOR, disclose two arrangements for achieving a high performance deaerator at atmospheric pressure, the deaerator of this invention provides an alternate solution for the problem of obtaining a high performance deaerator that is vented to atmosphere. Atmospheric deaerators are preferred for their safety features an their low cost in maintaining vessels at low temperatures and pressures.

The deaerator unit of the present invention is constructed with a divided vessel similar to the JET SPRAY ATMOSPHERIC DEAERATOR of U.S. Pat. No. 4,874,406 in which one side is steam pressurized to one to five psi. This small pressure differential allows for internal deaeration circuits that substantially reduce the venting of any steam and include simple temperature or pressure controls to maintain relatively constant temperature in the boiler feed water.

SUMMARY OF THE INVENTION

The deaerator unit of this invention is an atmospheric deaerator with a divided water vessel that includes a slightly pressurized section in order to maximize deaeration and maintenance of feed water temperatures and minimize the loss of steam through the atmospheric vent in the unpressurized section. By dividing the deaerating unit into separate pressurized and atmospheric sections and in using simple temperature or pressure controls, a high level of deaeration can be accomplished inexpensively.

The deaeration unit of this invention is particularly suitable for industrial processing equipment in which steam demand and condensate return may be irregular. The deaerating unit may be used in combination with select heat exchanges and flash condensers to maximize efficiencies in the water and steam circuits.

The deaerator unit is preferably constructed with an outer vessel or drum having an internal divider dividing the vessel into two substantially equal sections. One section is maintained slightly pressurized by incoming steam used in the temperature and pressure control process. The incoming steam is regulated by a temperature controlled, or pressure controlled steam supply valve. Communication between the pressurized heating and deaerating section and the atmospheric venting section is by a sparge pipe that purges heated gases from the pressurized heating section to the venting section. The sparge pipe is open and leads water vapor, non-condensible gases and some passing steam to the venting section where the past steam and vapor is recovered and the non-condensible gases vented.

The sparge pipe has an open end in the upper level of the pressurized section and also functions as an overflow pipe. The overflow pipe acts to maintain the water level in the pressurized section and because of its size act as an emergency pressure relief. Normally the water in the standpipe may have a maximum level in the heating section that is depressed because of the pressurization. However, if the pressure becomes excessive the water is blown through the pipe into the venting section thereby providing a clear path for pressure relief, since the venting section is vented to atmosphere. During normal operation, the water is forced into the pipe section in the atmospheric section by the continuous flow of gases.

The venting section has an atmospheric vent that is protected by a vent condenser that sprays a conically shaped spray of relatively cool water from the makeup water supply. The cool water condenses steam and absorbs condensate which falls with the makeup water to the water reservoir in the venting section of the vessel.

A small transfer or circulating pump delivers water from the cooler lower layers at the bottom of the venting section through a line to the heating section where the water is sprayed through a series of water level spray nozzles. Non-condensible gases that pass in small volumes to the heating section are, as noted, transferred back through the sparge pipe to the venting section together with the recoverable steam and vapor. The highly atomized and heated water from contact with the steam releases absorbed gases that are displaced by the incoming steam through the sparge to the venting section as previously described.

The steam control valve provides pressurized superheated steam to reheat water drawn from the bottom by the transfer pump, and hence lower temperature strata, of the venting section. The steam drives any remaining non-condensible gases from the circulated water sprayed into the heating section. Uncondensed team, condensate vapor and any purged non-condensible gases, as noted are forced through the sparge pipe to bubble up through the slightly cooler water in the mixing section, further condensing any past steam. The pressure of the rising column of water in the sparge pipe enables the desired low pressure to be maintained in the heating section during intermittent flow of gases blocking any back-flow of gases in the atmospheric section.

In one embodiment, a temperature sensor submerged in the water of the venting section maintains water temperature in the venting section by regulating the flow of superheated steam passing through the steam control valve, which acts as a superheater to elevate the water temperature in the heater section slightly higher than in the venting section. This slightly elevated temperature further aids in driving any residual non-condensible gases in the pressurized heating section to the venting section.

In an alternate embodiment, a pressure sensor in the atmospheric section maintains the low pressure in the pressurized section by use of a constricted vent to atmosphere in the atmospheric section.

Condensate from traps in the boiler and steam use circuit is returned to the pressurized section and gravity return of steam is returned to the venting section. The cool makeup water that is sprayed in a conical pattern around the atmospheric vent to condense any vagrant steam and flush any water vapor carried in the non-condensible gases as they vent through the atmospheric vent falls to the water of the venting section and mixes with part of the returned condensate.

The system of this invention reduces the number of components necessary to achieve the high order deaeration necessary to qualify as a 0.005 cc/liter deaerator.

DETAILED DESCRIPTION OF THE PREFERRED EMBODIMENTS

Figure 1:
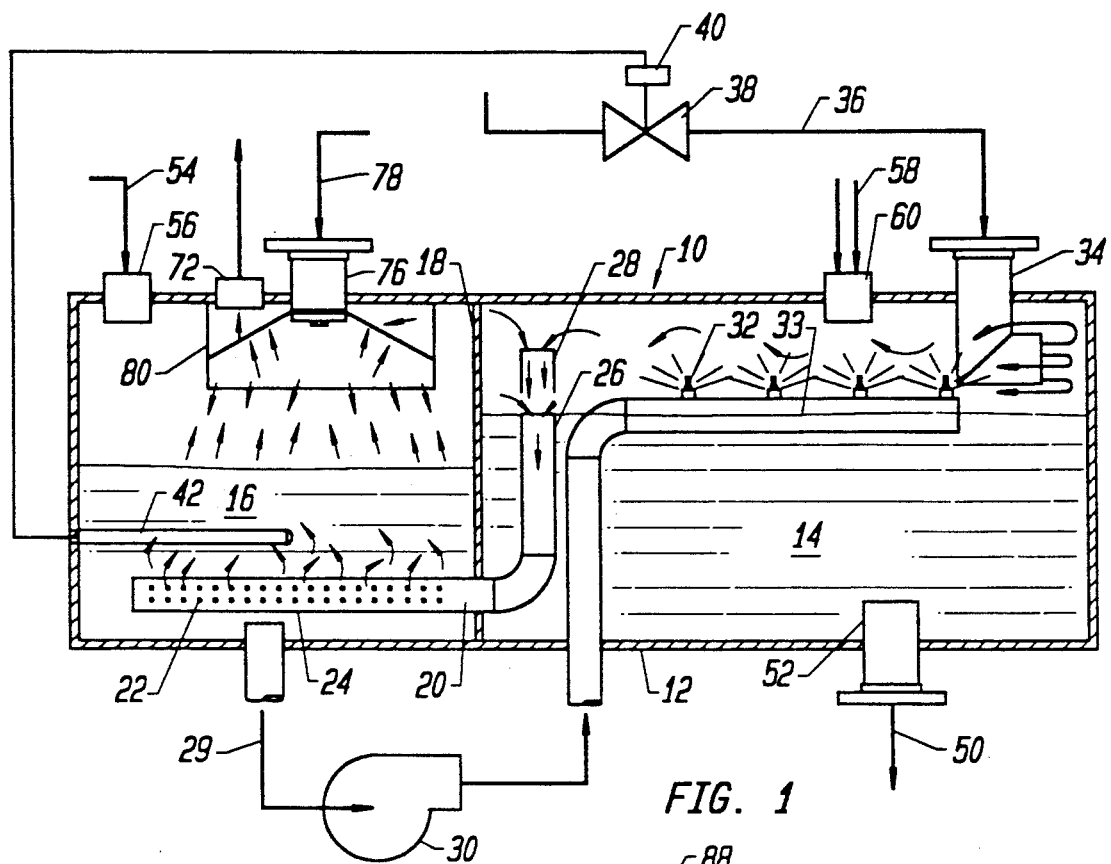
FIG. 1 is a cross sectional schematic view of a first embodiment of the atmospheric deaerator of this invention.

A first embodiment of the atmospheric jet spray deaerator unit of this invention is shown in FIG. 1 and designated generally by the reference numeral 10. The deaerator unit shown is constructed of a water vessel 12 divided into two sections, a heating section 14 and a venting section 16. The deaerator unit could be constructed with two separate water vessels that are interconnected by the systems that interconnect the two sections shown. Separating the heating section 14 and the venting section 16 is a centrally located wall 18. A sparge pipe 20 is passed through the central wall 18. The sparge pipe 20 passes pressurized gases from the heating section 14 to the bottom of the venting section 16 wherein a plurality of holes 22 in a horizontal segment 24 of the sparge pipe allow the gases to bubble up through the water maintained in the venting section of the deaerator unit. The sparge pipe 20 has a vertical section 26 in the heating section 14 that functions as an overflow stand pipe. The stand pipe section 26 allows the water level in the heating section to be maintained constant relative to the water level in the venting section. Excess water is recycled back from the heating section to the venting section through the sparge pipe 20. The stand pipe section 26 has an extension 28 above the stand pipe section 26 to draw gases from the upper part of the heating section 14 where heated gases collect. The sparge pipe 20, acts as a pressure relief mechanism such that any sudden excess pressure into the heating section will blow any standing water through the sparge pipe 20 for direct line communication with the venting section.

Water is cycled to the heating section by a small circulating pump 30 which draws water from the cooler, lower strata of the venting section 16 and circulates it through a circulation conduit 29 to a series of spray nozzles 32 in a horizontal segment 33 of the circulation conduit 29 arranged at water level. Pressurized steam from the steam boiler enter through elbow 34 to directly heat and deaerate the incoming spray of circulation water from the spray nozzles 32 of the circulation line 34.

Steam enters through a steam supply line 36 that has a supply control valve 38 that is thermally regulated. The supply control valve 38 is controlled by a temperature control 40 connected to an elongated thermal probe 42 in the lower strata of the water in the venting section 16 of the deaerator unit 10. Therefore, when the water temperature drops below a desired control temperature such as, 205° or 210° Fahrenheit, the supply control valve admits additional steam to the heating section. An optimum temperature can be selected for the system requirements and the use to which the deaerator is applied.

The lower temperature circulating water drawn from the bottom level of the venting section, is transferred to the gaseous upper level of the heating section 14 where superheated steam at an elevated temperature of approximately 240 Fahrenheit is mixed by direct contact with the water spray flashed down to about 215° fahrenheit for final deaeration as it passes through the sparge pipe to the venting section.

As the water is continuously cycled, and contained non-condensible gases continually stripped by the operation of the steam contact, the water in the heating section 14 becomes increasingly purged of non-condensible gases. Feed water for the steam boilers is drawn through a steam supply line 50 with a short stand pipe 52 at the bottom of the heating section of the deaerator unit. Condensate returned by gravity from the steam circuit is returned through a condensate inlet line 54 to a inlet 56 at the top of the vent section of the deaerator unit. Condensate under pressure, collected in traps in the steam circuit, is returned through inlet line 58 and inlet 60 at the top of the heating section of the deaerator unit.

To compensate for water loss in the steam supply circuit, makeup water is provided from a water supply (not shown) through a water supply line 62, together with pumped condensate and any supplemental circulating water, to the venting section of the deaerator unit next to an atmospheric vent 72. The cool water mix is supplied to the atmospheric vent 72 through spray nozzle 76 at the end of the water supply line 78. The spray nozzle directs a fine conical spray of cool water at a cylindrical shield 80. Uncondensed gases that are passed through the sparge pipe rise to the vent where condensible gases passing through the conical spray are condensed by the cool spray water. The non-condensible gases pass through the spray and are vented. The cool water spray that is supplied from the water supply may itself have non-condensible gases which are released during the spray process or which are subsequently released as the spray water falls to the water in the vent section of the deaerator unit and is heated. Eventually, water containing residual non-condensible gases is circulated to the heating section where the gases are released by mixing with the supplied steam.

Figure 2:
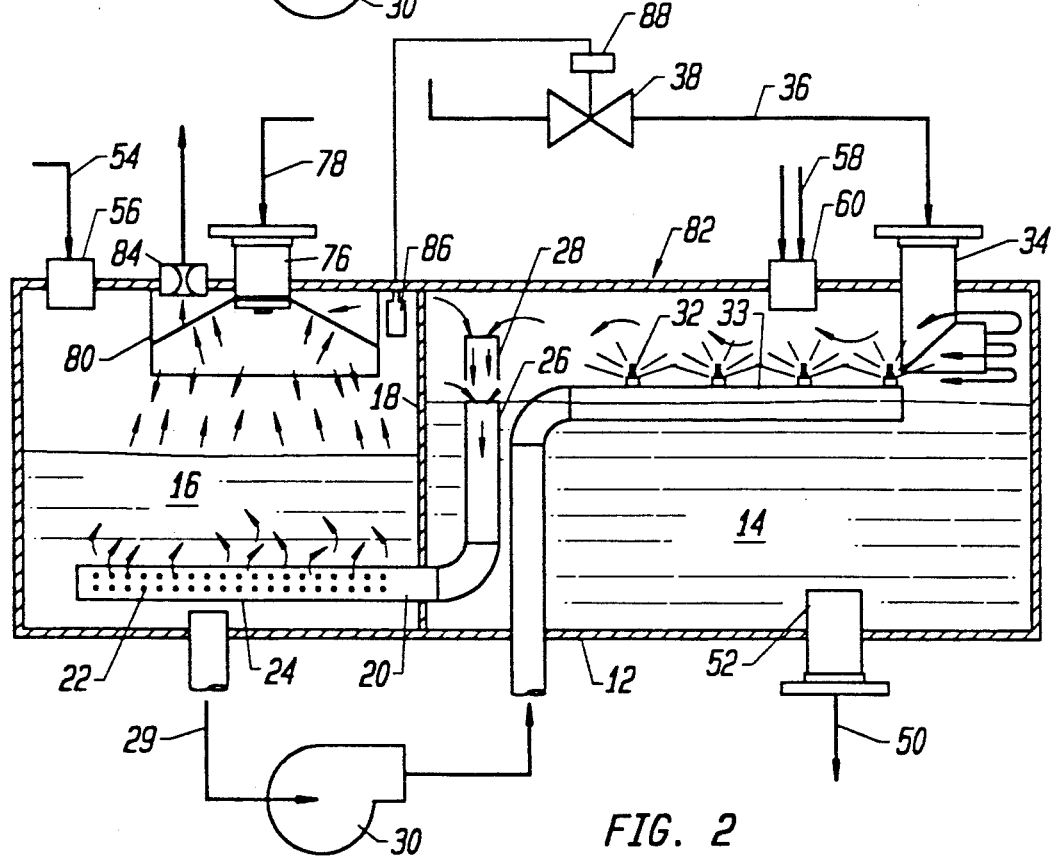
FIG. 2 is a cross sectional schematic view of a second embodiment of the pressurized deaerator of this invention.

The atmospheric deaerator unit shown in FIG. 2 and designated by the reference numeral 82 is substantially identical to that shown in FIG. 1. Except where differences are described, the reference numerals that were utilized with reference to FIG. 1 are also applicable with reference to FIG. 2.

It is desirable to operate the control systems for the designed deaerator units such that a temperature in the pressurized section is approximately 215° Fahrenheit. Elevating the temperature assists in purging any non-condensible gases from the water. The unpressurized section is in general kept slightly below the boiling point of water and in the thermostatically controlled systems is maintained at approximately 205° Fahrenheit. With reference to FIG. 1, this temperature is maintained via a feed-back loop to the thermostatic probe 42.

In the embodiment of FIG. 2, both sections are pressurized with the vented section having a constricted vent 84 for direct communication of the gases within the venting section 16 to atmosphere. The emission of steam from the steam line 36 displaces the gases in the heating section 14, forcing some gases through the constricted vent 84. In order to control the quantity of steam to be admitted, a pressure control sensor 86 is installed in the gaseous section of the venting section 16. This sensor is connected to a pressure control 88 for the steam supply valve 38. When the pressure in the venting section 16 drops below two or three pounds, additional steam is admitted into the heating section 14. Because of the ability of steam to blow through the column of water in the heating section and into the venting section, the pressure in the heating section is generally between five and ten pounds, which is considered a low pressure for a deaerator unit. Since the unit is one that communicates with the atmosphere, the unit can be categorized as an atmospheric deaerator unit.

While, in the foregoing, embodiments of the present invention have been set forth in considerable detail for the purposes of making a complete disclosure of the invention, it may be apparent to those of skill in the art that numerous changes may 15 be made in such detail without departing from the spirit and principles of the invention.

What is claimed is:

1. An atmospheric deaerator unit comprising:
    a first vessel means for containing a quantity of water and a volume of gas at atmospheric pressure, the first vessel means having a vent means for venting the first vessel means to atmosphere;
    a second vessel means for containing a quantity of water at a predetermined level and a volume of gas under pressure slightly higher than atmospheric pressure, the second vessel means having a steam admission and direct-contact heating means for deaerating and direct-contact heating water in the second vessel means, the steam admission and direct-contact heating means including a water spray means for spraying a fine spray of water into the volume of gas in the second vessel means above the predetermined level;
    communicating passage means between the first vessel means and the second vessel means, the communicating passage means comprising an L-shaped water column conduit communicating between the first and second vessel means with a stand pipe segment having an end for admission of water that is positioned at the predetermined level of water in the second vessel means and a horizontal segment extending into the first vessel means, the horizontal segment in the first vessel means having holes and an end submerged under the water in the first vessel means, wherein the communicating passage means provides a gas relief means for passing gases from the second vessel means to the first vessel means and a safety means for releasing excess pressure of gases in the second vessel means to the first vessel means; and
    first water circuit means for continuously circulating water from the first vessel means to the water spray means in the second vessel means, and, second water circuit means for circulating water from the second vessel means to a boiler, wherein the steam admission and direct-contact heating means includes a steam conduit having an end directly open to the volume of gas in the second vessel means with a steam valve proximate the end of the conduit, and valve having control means for regulating the steam admitted to the second vessel means from the steam conduit, and sensor means connected to the valve control means for regulating steam flow to the steam admission and direct-contact heating means in accordance with conditions in the deaerator unit.

2. The unit of claim 1 wherein the vent means includes a water spray nozzle to purge vented, non-condensible gases of water vapor and steam.

3. The unit of claim 2 wherein the deaerator and direct-contact heating means includes further, steam supply means for supplying pressurized steam to the steam conduit and a water supply means associated with the water spray nozzle for supplying water to the water spray nozzle.

4. The unit of claim 3 wherein the steam conduit is connected to a steam supply means regulated by the steam valve wherein the sensor means is a temperature control for supplying steam to the second vessel means according to the temperature in the first vessel means.

5. The unit of claim 4 wherein the temperature control includes a temperature sensor in the venting section.

6. The unit of claim 5 wherein the sensor means is a pressure control with a pressure sensor in the first vessel means.

7. The deaerator unit of claim 1 wherein the first vessel means and the second vessel means comprise separate compartments of a single vessel with a central divider.

8. The deaerator unit of claim 7 wherein the steam supply means includes a steam supply valve.

9. An low pressure deaerator unit comprising:
    a first vessel means for containing a quantity of water and a volume of gas at a pressure above atmospheric pressure, the first vessel means having a constricted vent means for restricted venting of the first vessel means to atmosphere, the vent means including a water spray nozzle to purge vented non-condensible gases of water vapor and steam;
    a second vessel means for containing a quantity of water at a predetermined level and a volume of gas under pressure slightly higher than the pressure in the first vessel means, the second vessel means having a steam admission means for deaerating water in the second vessel means, the steam admission means including a steam supply conduit and a steam supply valve and, steam supply regulating means with a pressure sensing means for sensing pressure in the first vessel means and controlling the regulating means to maintain a predetermined pressure in the first vessel means by a pressurized steam supplied to the second vessel means;
    communicating conduit means communicating between the first vessel means and the second vessel means for releasing excess pressure in the second vessel means to the first vessel means and passing gases from the second vessel means to the first vessel means, the communicating conduit means comprising an L-shaped water column conduit with a stand pipe segment having an end for admission of water positioned at the predetermined level of water in the second vessel means and a horizontal segment extending into the first vessel means, the horizontal segment in the first vessel means having holes and an end submerged under the water in the first vessel means;

water conduit means for continuously circulating water from the first vessel means to the second vessel means, the water conduit means having a spray means for spraying water into the second vessel means;

boiler feed means for circulating water from the second vessel means to a boiler; and, boiler return means for receiving condensate in the first vessel means from the boiler.

10. An atmospheric deaerator unit comprising:

a first vessel means for containing a quantity of water and a volume of gas at atmospheric pressure, the first vessel means having a vent means for venting the first vessel means to atmosphere;

a second vessel means for containing a quantity of water at a predetermined level and a volume of gas under pressure slightly higher than atmospheric pressure, the second vessel means having a steam deaerator means with at least one spray nozzle for deaerating water in the second vessel means;

conduit means communicating between the first vessel means and the second vessel means for releasing excess water and excess gas pressure in the second vessel means to the first vessel means wherein the conduit means comprises an L-shaped water column conduit communicating between the first and second vessel means with a stand pipe segment having an end for admission of water positioned at the predetermined level of water, the horizontal segment in the first vessel means having holes and an end submerged under the water in the first vessel means, wherein said stand pipe segment provides a water overflow for water in the second vessel means to the first vessel means and a blow down pipe for pressure release through the water column conduit from the second vessel means to the first vessel means wherein gases from the second vessel means pass to the first vessel means through the water column conduit;

water conduit means for continuously circulating water from the first vessel means to the spray nozzle in the second vessel means; and, water circulating means for circulating water from the second vessel means to a boiler and receiving condensate from the boiler.

* * * * *